United States Patent Office 3,057,004
Patented Oct. 9, 1962

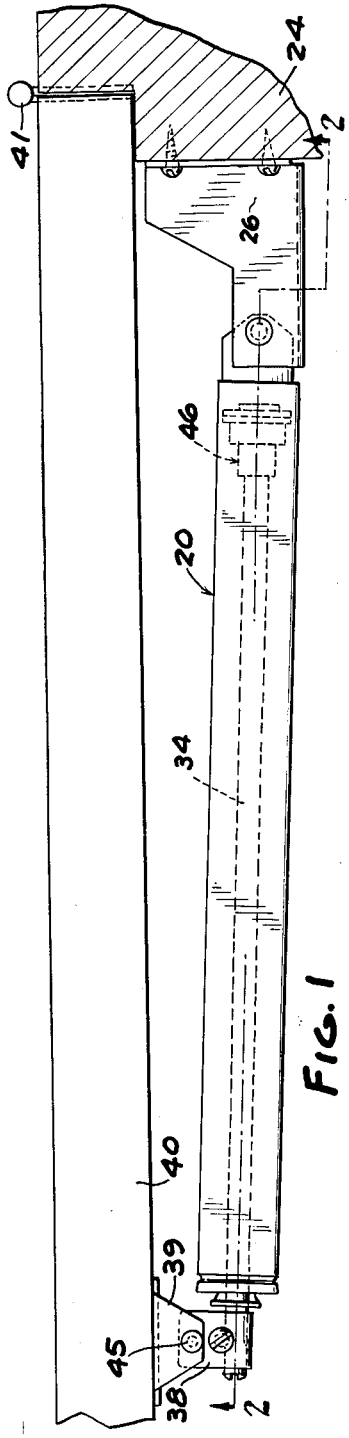
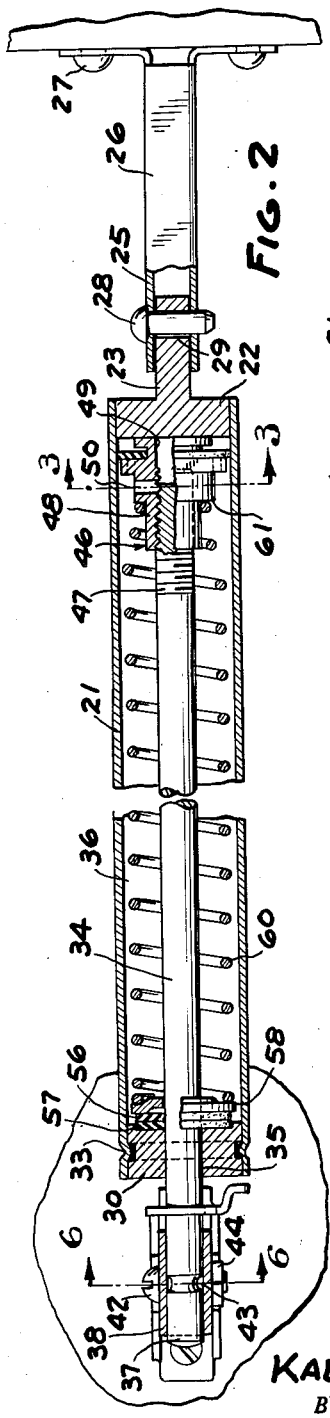
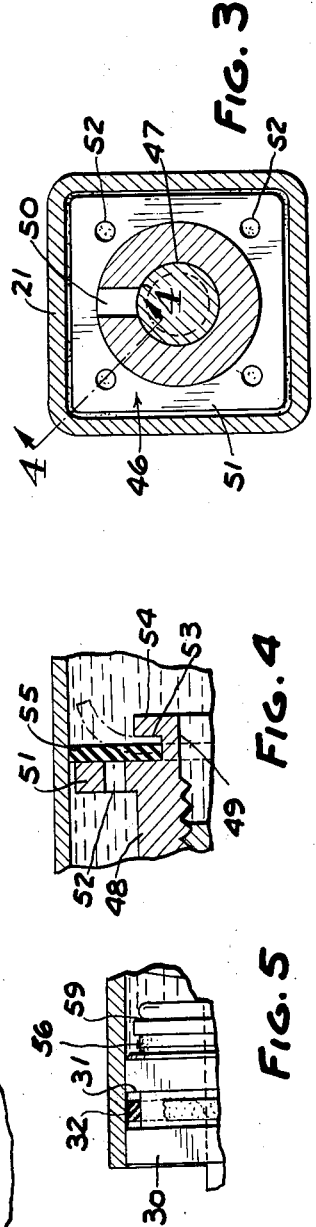
Oct. 9, 1962     K. P. SOGOIAN     3,057,004
HYDRAULIC DOOR CLOSER
Filed May 26, 1960     2 Sheets-Sheet 1
INVENTOR.
KALOUST P. SOGOIAN
BY
Barney, Kisselle, Raisch & Choate
ATTORNEYS

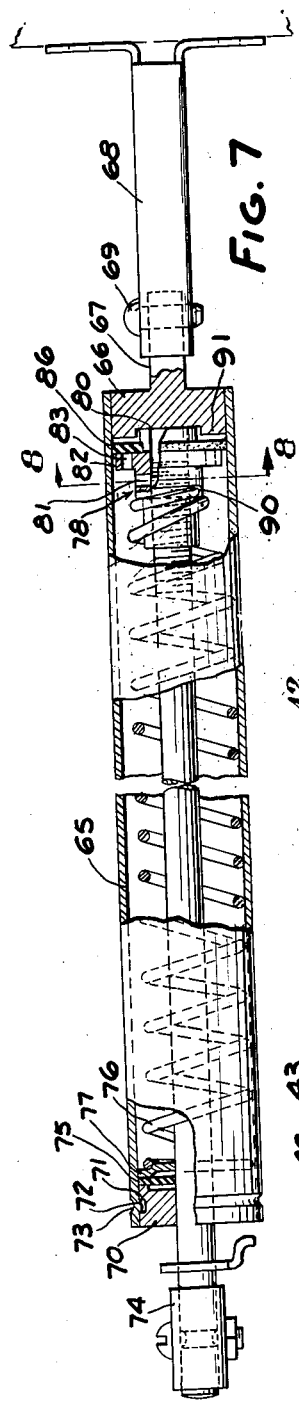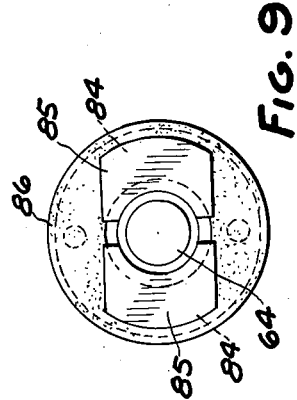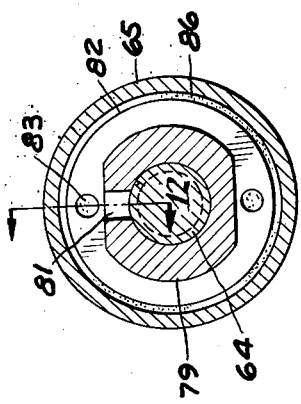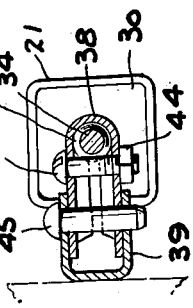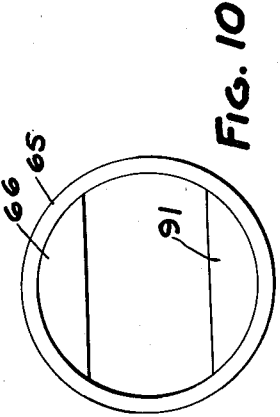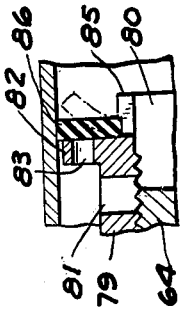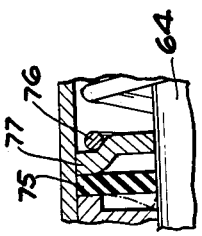

3,057,004
HYDRAULIC DOOR CLOSER
Kaloust P. Sogoian, 23633 Berg Road,
Southfield 41, Mich.
Filed May 26, 1960, Ser. No. 32,021
23 Claims. (Cl. 16—52)

This invention relates to hydraulic door closers and particularly to door closers for light-weight doors as are used around the home and in light commercial installations.

It has become common practice to provide door closers on the doors around the home, office or in light commercial applications. Such door closers usually operate by compression of a spring which upon release of the door operates to close the door. In order to control the operation of such closers, they commonly utilize air restricting or other pneumatic means to control the rate of closing of the door. It has also been suggested that hydraulic means may be used to control the rate of closing of the door, but such means have not received practical commercial success because of problems of providing hydraulic seals and of adjusting the rate of closing. Accordingly, a simple operating inexpensive construction has not been heretofore possible utilizing hydraulic means.

It is an object of this invention to provide a novel hydraulic door closer which provides for a uniform rate of closing of the door.

It is a further object of the invention to provide such a hydraulic door closer which has novel means for resetting the rate of closing the door.

It is a further object of the invention to provide such a hydraulic door closer having novel valve means therein which can be adjusted externally of the closer without taking the closer apart.

It is a further object of the invention to provide such a hydraulic door closer which has combined valve and piston means.

It is a further object of the invention to provide such a hydraulic door closer that can be manufactured at low cost.

In the drawings:

FIG. 1 is a fragmentary plan view of a hydraulic door closer embodying the invention showing the closer in position on a door and jamb.

FIG. 2 is a fragmentary sectional view taken along the line 2—2 in FIG. 1.

FIG. 3 is a sectional view taken along the line 3—3 in FIG. 2.

FIG. 4 is a fragmentary sectional view taken along the line 4—4 in FIG. 3.

FIG. 5 is a fragmentary sectional view on an enlarged scale of a portion of the closer shown in FIG. 2 during assembly.

FIG. 6 is a fragmentary sectional view taken along the line 6—6 in FIG. 2.

FIG. 7 is a part sectional elevational view of a modified form of closer.

FIG. 8 is a sectional view taken along line 8—8 in FIG. 7.

FIG. 9 is an end view of the valve member utilized in FIG. 7.

FIG. 10 is an opposite end view of the closer casing and end member prior to assembly.

FIG. 11 is a fragmentary sectional view on an enlarged scale of a portion of the closer shown in FIG. 7.

FIG. 12 is a fragmentary sectional view on an enlarged scale of another portion of the closer shown in FIG. 7.

Referring to FIGS. 1 and 2, the hydraulic door closer 20 embodying the invention comprises a tubular casing 21 which is preferably square in cross section and has one end thereof closed by a plug 22 which is formed with an integral extension 23 providing a means for pivoting the door closer to a door jamb 24. Extension 23 extends between the spaced walls 25 of a bracket 26 that is mounted on jamb 24 by screws 27. A rivet or pin 28 extends through aligned openings in the walls 25 and through an opening 29 in the extension 23 to thereby pivot the casing 21 on the bracket 26 and, in turn, the jamb 24.

A plug 30 is provided at the other end of tubular casing 21 and as shown in FIG. 5, is formed with a peripheral groove 31 which is rectangular in cross section. A rectangular gasket 32 of soft resilient material such as Buna-N rubber is positioned in the groove 31, the gasket having a lesser width prior to assembly than the groove as shown in FIG. 5. The casing 21 is crimped or bent inwardly as at 33 compressing the gasket 32 into the groove 31 to seal and hold the plug 30 in position thereby closing the end of the casing 21.

A piston rod 34 extends through an opening 35 in the plug 30 with one end thereof extending within the chamber 36 of the casing and the other end thereof extending externally of the casing. The end 37 of rod 34 which is externally of the casing 21 is held by a clamp 38 which, in turn, is pivoted to a bracket 39 fixed on door 40 at a point spaced from the door hinge 41. Specificially, as shown in FIG. 6, clamp 38 is U-shaped and a bolt 42 extends through the legs of the clamp 38 through a groove 43 in rod 34 and a nut 44 is threaded on the bolt 42 to clamp the rod 34. The clamp 38 is pivoted to the bracket 39 by a pin or rivet 45.

A valve and piston assembly 46 is threaded on the end 47 of rod 34 within the chamber 36. As shown in FIGS. 2, 3 and 4, valve and piston assembly 46 comprises a valve member 48 which is generally cylindrical and has an axial opening 49 extending therethrough. One end of the opening 49 is threaded so that the end of the rod 47 can be threaded into the opening 49. Valve member 48 is also provided with a radial opening 50 which provides communication between the exterior of the valve member 48 and the axial opening 49. By threading the valve member 48 inwardly and outwardly on the shaft 34, the opening 50 can be selectively restricted to control the flow of hydraulic fluid through the port 50 and opening 49.

As shown in FIGS. 3 and 4, valve member 48 is formed with a radially extending flange 51 which is rectangular in cross section and has its periphery spaced from the internal surface of the chamber 36. Axially extending ports 52 are provided in the flange 51 along diagonal lines of the flange 51 (FIG. 3). Valve member 48 includes an annular groove 53 formed by a short lip 54 spaced from the flange 51. A rectangular disc 55 of soft elastic material such as synthetic rubber is mounted in the groove 53 and has the periphery thereof extending into sealing contact with the internal surface of casing 21. As shown in FIG. 4, disc 55 is of generally uniform thickness and operates when the piston rod 34 and valve assembly 46 is moved in one direction, to the right as shown in FIGS. 2 and 4, to close the axial ports 52 and when the piston rod 34 and valve and piston assembly 46 are moved in the opposite direction, to the left as shown in FIGS. 2 and 4, to open the axial ports 52. Specifically, when the piston rod is moved to the left, the corner portions of the disc 55 are bent away from the internal surface of the casing 21 as shown in dotted lines in FIG. 4 to open the ports 52.

To prevent the leakage of hydraulic fluid between the piston rod 34 and the opening 35 of plug 30, a pair of annular washers 56 of soft resilient material such as synthetic rubber are provided. The outer washer 56 seats in a groove 57 on the internal surface of plug 30. A metal disc 58 is positioned over the inner washer 56 and has an axially displaced peripiheral portion. One surface of portion 59 bears on the rim of the inner washer 56, and one end of a compression spring 60 seats against the other surface of portion 59. The other end of the compression spring rests on a shoulder 61 on the valve member 48 (FIG. 2) thereby sealing washers 56 above rod 34 and preventing leakage of hydraulic fluid through opening 35.

In operation, when the door 40 is opened, the piston rod moves outwardly relative to the casing 21 compressing the spring 60. At the same time, fluid flows from within the chamber 36 simultaneously through port 50 to opening 49 and through axial ports 52, the corners of the disc 55 bending away as shown in FIG. 4 to permit the flow through the axial ports 52. When the door is released, the spring 60 operates to retract and close the door. The piston rod 34 is moved inwardly relative to casing 21, the pressure of hydraulic fluid on disc 55 closes the axial ports 52 so that the only flow of fluid is through opening 49 and radial port 50. In this manner during the closing movement, the flow of fluid is restricted.

The rate at which fluid flows to the port 50 and opening 49 during both opening and closing may be controlled by adjusting the relative position of the rod 34 relative to the valve member 48, that is, by threading the rod 34 inwardly and outwardly to restrict the port 50 more or less. Specifically, this is done by loosening the bolt 42 and nut 44, rotating the rod 34 and again tightening the bolt 42 and nut 44. Rotation of the valve member 48 during this time is prevented by the rectangular configuration of the flange 51 of valve member 48 and casing 21.

In the form of the invention shown in FIGS. 7 through 12, the hydraulic door closer includes a tubular casing 65 which is cylindrical in shape and has one end thereof closed by a plug 66 having an extension 67 pivoted to the spaced flanges of a bracket 68 by a pin 69 as in the previous form of the invention. The other end of the casing 65 is closed by a plug 70 that has a peripheral groove 71 in which a portion of the casing is bent or distorted as at 73.

The free end of piston rod 64 is held by a clamp 74 that may be pivoted to the bracket on the door and operates to hold the rod as in the form of the invention shown in FIGS. 1 to 6.

As shown in FIGS. 7 through 12, the inner surface of end member 70 is provided with a peripheral flange and an annular washer 75 of soft resilient material has the periphery of one surface thereof engaging this flange. The diameter of washer 75 is greater than the internal diameter of the casing 65. The washer 75 has an opening therein of slightly less diameter than the diameter of the rod 64. A rigid washer 77 having an axially offset peripheral flange which engages the other surface of the washer 75 and the end of the spring 76 engages the washer 77. As the rod 64 is moved axially relative to the casing 65 the washer 75 assumes a conical configuration as shown in dotted lines in FIG. 11 in the direction of movement of the piston rod 64. This provides a seal between the washer 75 and the piston rod. At the same time, the periphery of washer 75 engages the inner surface of casing 65 to provide an oil seal preventing hydraulic fluid from passing through the periphery of plug 70. In this fashion, the same washer 75 is used to provide a seal with the inner surface of casing 65 and with the rod 64.

In addition to differing in utilizing a tubular casing, the form of the invention shown in FIGS. 7 through 12 utilizes a combined valve and piston assembly 78 which includes a valve member 79 that is formed with an axial opening 80 and a radial port 81 communicating with the axial opening so that when the valve member 79 is threaded in and out on the rod 64, the port 81 is selectively restricted to control the flow of fluid through the port 81 and opening 80. Valve 79 includes a radial flange 82 that is formed with diametrically opposed axial ports 83. Valve member 79 also includes opposed arcuate grooves 84 formed by short flanges 85 spaced from the flange 82. An annular disc 86 of soft resilient material such as synthetic rubber is provided in the grooves 84 concentric with the axis of the valve member 79 and extends radially outwardly into sealing contact with the internal surface of the casing 65.

When the door closer shown in FIG. 7 is assembled, the coil spring 76 is compressed and distorted so that portions of the coil spring engage the inner surface of casing 65. This prevents the rotation of the valve assembly 78 relative to the rod 64 and the resultant change in adjustment that would occur in the restriction of port 81. The end of the spring 64 engages an axial surface 90 formed by a radial shoulder on the valve 79 to prevent the rotation of the valve member 79. The spring 64 is mounted in a direction opposite to the direction of the threads on the end 47 of rod 34.

It has been found that any tendency for gurgling due to presence of air in the casing 65 is minimized when the axial ports 83 are placed as close as possible to the rod 64 so that a space can exist above the uppermost opening 83 for air to collect while at the same time the opening 83 is submerged in the hydraulic fluid.

In operation, when the door is opened, piston rod is moved outwardly of casing 65 compressing the spring 76 and, at the same time, hydraulic fluid flows through the port 81 and opening 80 and also through axial ports 83, the disc 86 bending away from the internal surface of the casing 65 to permit flow of fluid through the axial ports 83. When the door is released, it is caused to be closed by the spring 76, the disc 86 closing the axial ports 83 so that flow of hydraulic fluid occurs only through the axial opening 80 and port 81. In this fashion, the door is caused to close at a predetermined uniform rate. The rate at which fluid flows to the port 81 and opening 80 may be controlled by loosening the clamp 74, rotating the rod 64 to thread the end of the rod 64 inwardly or outwardly of the valve member 79. End member 66 has a transverse slot 91 which is engaged by flanges 85 and can be used to break the engagement of the threads between rod 64 and valve 78 in case they become locked together, the slot 91 engaging the flanges to hold valve 78 so that rod 64 can be turned.

It can thus be seen that I have provided a hydraulic door closer which provides a uniform rate of closing. In addition, the hydraulic door closer incorporates a novel valve and piston assembly wherein the valving and the sealing of the piston are accomplished simultaneously. The hydraulic door closer incorporates simple and effective means for preventing leakage of hydraulic fluid.

This application is a continuation-in-part of my copending application Serial No. 801,915, filled March 25, 1959, and titled Door Closer.

I claim:

1. A hydraulic door closer comprising a housing having a piston chamber, a piston rod movable within said housing with one end thereof within said chamber and the other end thereof externally of said housing, means connecting said other end to a door or the like, a valve on said one end of said rod comprising a valve member having a first port providing continuous communication between one side of said valve member and the other side of said valve member and a second port extending between one side of said valve member and the other side of said valve member, a flexible, resilient member on said valve member closing said second port when the valve is moved in said chamber in one direction and opening said second port when the valve member is moved in the other direction, said flexible, resilient member extending radially outwardly into sealing contact with the sides of said piston chamber throughout the periphery thereof, portions of said resilient member being adapted to flex out of sealing contact with the sides of the piston chamber when the valve is moved in a direction to open said second port thereby permitting hydraulic fluid to flow past the periphery of said portions, and spring means opposing the movement of said valve member in said chamber in the direction wherein said resilient member tends to open said second port.

2. The combination set forth in claim 1 wherein said piston chamber is rectangular in cross section, said valve member benig generally rectangular in cross section and said resilient piston ring member being rectangular in cross section conforming to the interior surface of said chamber.

3. The combination set forth in claim 1 wherein said piston chamber is generally circular in cross section, said valve member being circular in cross section and said resilient member being circular in cross section conforming to the interior surface of said piston chamber.

4. The combination set forth in claim 1 wherein said valve member is threaded on the end of said piston rod for movement longitudinally relative to said rod, said movement selectively restricting the first port in said valve member.

5. The combination set forth in claim 4 wherein said means connecting the other end of said rod to a door or the like includes means for selectively clamping said piston rod in any predetermined rotated position relative to the valve member.

6. A hydraulic door closer comprising a housing having a piston chamber therein, a piston rod reciprocably mounted in said housing with one end thereof extending within said chamber and the other end thereof extending externally of said chamber, means for connecting said other end of said rod to a door or the like, a valve member mounted on said first end of said rod within said piston chamber, said valve member having an axial opening therethrough, a radial port communicating with said axial opening, and an axial port extending from one side of said valve member to a longitudinally spaced point on the other side of said valve member, a disc of flexible resilient material mounted on said valve member and extending radially outwardly into sealing contact with the internal surface of said piston chamber throughout the periphery thereof, said disc acting on said axial port to close said axial port when said piston rod is moved in one direction and to open said axial port when said piston rod is moved in the opposite direction, portions of said resilient member being adapted to flex out of sealing contact with the sides of the piston chamber when the valve is moved in a direction to open said axial port thereby permitting hydraulic fluid to flow past the periphery of said portions.

7. The combination set forth in claim 6 wherein said valve member is threaded on said end of said piston rod for movement longitudinally relative to said rod, said movement of said piston rod selectively restricting said radial port in said valve member.

8. The combination set forth in claim 7 wherein said piston chamber is rectangular in cross section providing four corners, said valve member being rectangular in cross section, said axial port lying along a diagonal line connecting diagonally opposite corners of said valve member.

9. A hydraulic door closer comprising a tubular casing defining a piston chamber, a rod reciprocably mounted in said casing with one end thereof within the chamber and the other end thereof externally of the chamber, means for connecting the other end thereof to a door or the like, a valve member threaded on the end of said rod within said chamber, said valve member having an axial opening therein and a radial port communicating with said opening, said piston rod being operative in any predetermined adjusted position to selectively restrict said radial port, said valve member including a radial flange, said valve member having at least one axial port extending through said radial flange, a disc of flexible resilient material mounted on one side of said radial flange having a portion thereof adapted to close the axial port in said radial flange when said valve member is moved in one direction within said chamber, said portion being operative by bending of said disc to open said axial port when the valve member is moved in the opposite direction, said disc extending radially outwardly into sealing contact with the internal surface of said piston chamber along the entire periphery thereof, said portion of said disc being movable out of sealing contact with the internal surface of said piston chamber when it bends to open said axial port thereby permitting hydraulic fluid to flow past the periphery of said portion.

10. The combination set forth in claim 9 wherein said means for connecting the other end of said piston rod to a door or the like includes means for selectively clamping said rod in any predetermined adjusted position relative to said valve member.

11. The combination set forth in claim 9 including means for closing one end of said tubular casing comprising a plug positioned within said tubular casing, said plug having a peripheral groove therein, a gasket in said groove, said tubular casing being bent inwardly compressing said gasket into said peripheral groove.

12. The combination set forth in claim 9 including means for sealing around said rod comprising at least one disc of resilient material, a spring being positioned within said chamber surrounding said shaft and having one end thereof on contact with said valve member and the other end thereof compressing said sealing disc against the end of said tubular casing.

13. The combination set forth in claim 1 including means for sealing around the end of said rod comprising a washer of resilient material having an axial opening therein through which said rod projects, the diameter of said opening being less than the diameter of said rod, means for gripping said washer in spaced relationship to said rod thereby providing a central portion of the washer surrounding said rod which will flex as the rod moves axially, said washer having a portion thereof projecting into sealing contact with the periphery of the casing.

14. A hydraulic door closer comprising a housing defining a piston chamber, a piston rod reciprocably mounted in said housing with one end thereof extending within said chamber and the other end thereof extending externally of said housing, valve means on the end of said piston rod within said chamber adapted to selectively restrict communication between one side of said valve member and the other, means for sealing around the end of said rod comprising a washer of resilient material having an axial opening therein through which said rod projects, the diameter of said opening being less than the diameter of said rod, means for gripping said washer in spaced relationship to said rod thereby providing a central portion of the washer surrounding said rod which will flex as the rod moves axially, said washer having a portion thereof projecting into sealing contact with the periphery of the casing and means for resiliently applying an axial force to said gasket around said rod surrounding said central portion of the washer.

15. A hydraulic door closer comprising a housing defining a piston chamber, a piston rod reciprocably and rotatably mounted in said housing with one end thereof extending within said chamber and the other end thereof extending externally of said housing, a valve member on the end of said piston rod within said chamber adapted to selectively restrict communication between one side of said valve member and the other, said piston rod being rotatable relative to said valve member and said housing to adjust the rate of flow from one side of said valve member to the other, and means for preventing relative rotation between said rod and said valve member in any predetermined adjusted position of said rod relative to said valve member.

16. The combination set forth in claim 15 wherein said means for preventing relative rotation between said rod and said valve member comprises interengaging means between said housing and said valve member.

17. The combination set forth in claim 15 wherein said piston chamber has a rectangular cross section, said valve member having portions thereof contacting said rectangular housing and thereby preventing rotation of said valve member relative to said housing.

18. A hydraulic door closer comprising a housing defining a piston chamber, a piston rod reciprocably mounted in said housing with one end thereof extending within said chamber and the other end thereof extending externally of said housing, a valve member on the end of said piston rod within said chamber adapted to selectively restrict communication between one side of said valve member and the other, said valve member being rotatable relative to said piston rod to adjust the rate of flow from one side of said valve member to the other, a helical spring compressed between one end of said casing and said valve means, said spring having portions thereof distorted transversely into engagement with the inner surface of said housing thereby preventing relative rotation between said rod and said valve member.

19. The combination set forth in claim 18 wherein interengaging means are provided between said spring and said valve member.

20. A hydraulic door closer comprising a housing defining a piston chamber, a piston rod reciprocably mounted in said housing with one end thereof extending within said chamber and the other end thereof extending externally of said housing, valve means on the end of said piston rod within said chamber adapted to selectively restrict communication between one side of said valve member and the other, means for sealing around the end of said rod comprising a washer of resilient material having an axial opening therein through which said rod projects, the diameter of said opening being less than the diameter of said rod, an end wall in said housing defining an annular surface engaging one side of said washer and spaced from the rod to provide a central portion of the washer surrounding the rod which will flex as the rod moves axially, said washer having a portion thereof projecting into sealing contact with the periphery of the casing, a helical spring compressed between said one end of said piston rod and said end wall and engaging the other side of said washer along an annular surface opposed to said first-mentioned annular surface of said end wall to apply an axial force resiliently on said gasket at said annular surfaces.

21. The combintion set forth in claim 20 including a rigid washer interposed between said helical spring and said resilient washer.

22. The combination set forth in claim 21 wherein said rigid washer includes a portion thereof projecting axially within the end of said helical spring and thereby locating said spring radially of said housing.

23. A hydraulic door closer comprising a housing defining a piston chamber, a piston rod reciprocably and rotatably mounted in said housing with one end thereof extending within said chamber and the other end thereof extending externally of said housing, a valve member threaded on the end of said piston rod within said chamber adapted to selectively restrict communication between one side of said valve member and the other, said piston rod being rotatable and movable axially relative to said valve member and said housing to adjust the rate of flow from one side of said valve member to the other, and means for preventing relative rotation between said rod and said valve member in any predetermined adjusted position of said rod relative to said valve member.

References Cited in the file of this patent

UNITED STATES PATENTS

| 991,889 | Proven | May 9, 1911 |
| 2,284,424 | Hein | May 26, 1942 |
| 2,421,595 | Brown | June 3, 1947 |
| 2,903,733 | Schroeder | Sept. 15, 1959 |
| 2,920,338 | Falk | Jan. 12, 1960 |
| 2,930,070 | Uebelhoer | Mar. 29, 1960 |
| 2,957,734 | McLeod | Oct. 25, 1960 |
| 2,996,754 | Ziegler et al. | Aug. 22, 1961 |
| 3,025,558 | Hawks | Mar. 20, 1962 |

FOREIGN PATENTS

| 444,046 | Great Britain | Mar. 12, 1936 |